United States Patent Office 3,582,518
Patented June 1, 1971

3,582,518
FLAME-RETARDANT COMPOSITION COMPRISING POLYVINYLIDENE FLUORIDE, ANTIMONY OXIDE AND DEHYDROFLUORINATION CATALYST
Bernard John Lyons, Palo Alto, Calif., assignor to Raychem Corporation, Menlo Park, Calif.
No Drawing. Continuation-in-part of abandoned application Ser. No. 438,122, Mar. 8, 1965. This application Mar. 7, 1968, Ser. No. 711,184
Int. Cl. C08g *51/04;* C08k *1/06*
U.S. Cl. 260—41                                                25 Claims

ABSTRACT OF THE DISCLOSURE

Polymers are flame-retarded by incorporating into the polymer a polyvinylidene fluoride, antimony oxide and a metal activator such as metal compounds wherein the metal is selected from the group consisting of aluminum, titanium, zirconium, hafnium, columbium, tantalum, tungsten, boron, chromium, molybdenum and nickel.

---

This is a continuation-in-part of my copending application Ser. No. 438,122, filed Mar. 8, 1965, now abandoned, the disclosure of which is incorporated herein by reference.

BACKGROUND OF THE INVENTION

Polymers have found many uses in modern technology and industry. However, polymers often do not have the necessary flame resistance for high temperature uses. As a result, it is necessary to add materials which will flame-retard the polymers. Unfortunately, it has been found that conventional flame-retarding techniques do not produce satisfactory overall results. Especially in the case of condensation polymers, flame resistance is often obtained at the expense of rather severe deterioration in other properties, particularly heat-aging.

Perhaps the most popular conventional flame-retarding technique is the use of a metal oxide such as antimony oxide and a halogenated material such as chlorinated waxes. It is hypothesized that such flame-retarding systems function by producing an inorganic halide which volatilizes and combines with the free radicals produced during the combustion of the organic plastic material thereby inhibiting the capability of the free radicals to propagate combustion. Thus, the instability of these systems at relatively high temperatures is a direct source of their flame-retarding capabilities.

However, it is now believed that this instability of conventional flame-retardant systems is such that the halogen-bearing compounds catalyze the degradation of polymers and particularly condensation polymers such as polyurethanes at slightly elevated temperatures because they liberate traces of halogen acids at these temperatures. For example, Texin 480 A, a polyurethane manufactured by Mobay Chemical Company, has a useful life of 2,500 hours at 175° C. when crosslinked. When mixed with polyvinylchloride or chlorowax 70S and antimony oxide in sufficient quantity to flame-retard the polyurethane and subsequently crosslinked, the useful life at 175° C. is reduced to only 3 hours. While the present invention is not to be considered to be limited to any particular theory of operation, it is believed that it successfully produces substantial flame resistance without substantial degradation of heat-aging properties in such condensation polymers because the flame-retardant systems of the present invention do not liberate deleterious traces of halogen acids until relatively high temperatures are reached. Thus, it would appear that the flame-retardant systems of the present invention are highly stable at slightly elevated temperatures, but quite unstable at substantially elevated temperatures corresponding to the flame or combustion temperature of polymers. These properties of the flame-retardant systems of the present invention are all the more surprising in view of the fact that the systems of the present invention have some similarity to conventional systems in that they comprise metal oxides and a halogenated organic material.

SUMMARY OF THE INVENTION

According to the present invention, polymers, and especially those polymers which are susceptible to degradation caused by halogen-bearing compounds, are flame-retarded by incorporating into the polymer polyvinylidene fluoride, antimony oxide and a metal compound which acts as an activator.

It is, therefore, an object of the present invention to provide novel flame-resistant polymers.

It is another object of the present invention to provide flame-resistant polymers which have excellent heat-aging properties.

It is another object of the present invention to provide flame-resistant polymers containing a flame-retardant system comprising polyvinylidene fluoride-metal oxide combinations.

It is still another object of the present invention to provide compositions which may be incorporated in a polymer to provide flame resistance.

Other objects and advantages of the present invention, it is believed, will be apparent from the following description of specific embodiments thereof.

DESCRIPTION OF PREFERRED EMBODIMENTS

Broadly, the present invention comprises polymers containing a flame-retardant system comprising a polyvinylidene fluoride-metal compound combination. It has been found that polyvinylidene fluoride alone is not an effective flame-retardant in polymers. Similarly, use of what might be considered the conventional technique of combining polyvinylidene fluoride with antimony oxide was not successful in flame-retarding polymers, presumably because the polyvinylidene fluoride is not sufficiently unstable at the flame temperature of the polymer to produce flame-retarding amounts of antimony trifluoride. However, it has been found that when still another metal compound such as titanium oxide or aluminum oxide is added to the polyvinylidene fluoride-antimony oxide combination, a highly effective flame-retardant system results and that the severe decrease in heat-aging properties which often occurs when conventional flame-retardant systems are used does not result.

Other metal compounds which may be combined with polyvinylidene fluoride and antimony oxide to produce flame-retardant systems coming within the scope of the present invention are compounds of certain elements selected from groups IV–B, V–B, VI–B, VIII, I–B, II–B and III–A of the Periodic Table including zirconium, hafnium, columbium (niobium), tantalum, tungsten and boron. The oxides of these elements are preferred, but other compounds of these elements may also be used in the present invention. Compounds of other elements such as chromium, molybdenum and nickel may also be used. However, it has been found that compounds of iron, cadmium and zinc do not appear to have significant effect in flame-retardant systems of the type contemplated by the present invention.

The present invention also contemplates a two-component system, specifically a system comprising polyvinylidene fluoride and an aluminum compound. However, it has been found that the amount of aluminum compound, preferably the oxide, in this system must be substantially larger than the amount of aluminum compound needed to produce equivalent properties in the three-component systems described above.

The flame-retardant systems of the present invention are generally useful in all polymers. However, they are particularly useful in condensation polymers of the type which are susceptible to degradation by halogen-bearing compounds at relatively low temperatures such as polyurethanes and silicone polymers. Examples of other polymers which are flame-retarded by the present invention are polyethylene, polyacrylic esters, their copolymers, etc.

The flame-retardant systems of this invention may be used in polyurethanes of the type described in Pat. No. 3,036,996, the disclosure of which is incorporated by reference herein. Broadly, the polyurethanes which may be flame-retarded according to the present invention may be prepared by reacting a polyisocyanate with a prepolymer prepared by reacting a dicarboxylic acid and a diol or by additional polymerization of cyclic oxides such as ethylene oxide or polypropylene oxide to produce low molecular weight hydroxyl terminated polymers whereby an isocyanate terminated low molecular weight polymer is obtained and then reacting the isocyanate terminated low molecular weight polymer with a chain extender such as a diol or a diamine such as diethylene glycol or 4,4'-methylene-bis-(2-chloroaniline), respectively.

Furthermore, the flame-retardant systems of the present invention are particularly useful in irradiated and otherwise crosslinked polymers. In fact, in some embodiments of the present invention, a primary utility of the flame-retardant system is concerned with irradiated polyurethanes, e.g., the system comprising polyvinylidene fluoride, antimony oxide and tantalum oxide.

The present invention is further illustrated by the following examples. The flammabilities set forth in these examples were determined in accordance with ASTM–D635 and are set forth in distance burned in inches. The proportions of additives in the polymer are set forth in parts per hundred of resin and the irradiation dose is set forth in megarads, the irradiation in each case comprising high energy electrons. The heat-aging tests were carried out on 6 x 0.5 x 0.05 inch samples hung in air gravity ovens at 175° C. The time which elapsed before the samples cracked on flexing through 180° at room temperature or elongated to the floor of the oven, 12 inches below the samples, was noted and is expressed in the tables in hours.

EXAMPLE I

Each of the samples used in this example comprised polyurethane, Texin 48° A, which contained four parts per hundred of methylene bis-acrylamide. The polyurethane contained twenty parts per hundred of polyvinylidene fluoride (Kynar 1900E manufactured by Pennsalt) together with certain metal oxides in the amounts indicated in Table 1. The flammability and heat-aging properties of these samples are indicated in Table 1.

As shown in Table 1, the combination of polyvinylidene fluoride with antimony oxide alone or with titanium dioxide alone did not impart any appreciable flame retardancy to the composition. However, when antimony oxide was combined with the other additive compounds, a substantial flame retardancy was imparted. In this regard, it is to be pointed out that all samples other than those indicated as "burns" or "greater than 2 inches" were rated as self-extinguishing. It is also to be noted that in each case, the heat-aging life of the sample was over 1,000 hours, often over 2,000 hours and in some cases over 3,000 hours which latter represents an improvement over polyurethane to which no flame retardants have been added. Thus, for the first time, the flame retardant systems of the present invention imparted substantial flame resistance to the polyurethane while retaining heat aging properties to a very substantial degree.

TABLE 1[1]

| Additive | Amount of additive (p.h.r.) | $Sb_2O_3$ (p.h.r.) | Flammability (inches) after Irradiation dose of: (megarads) | | | | Heat aging life (hours) at 175° C. after irradiation dose of: (megarads) | | | |
|---|---|---|---|---|---|---|---|---|---|---|
| | | | 0 | 5 | 10 | 20 | 0 | 5 | 10 | 20 |
| $TiO_2$ | 5 | 0 | Burns | Burns | Burns | Burns | 3,807 | 3,645 | 3,453 | 3,023 |
| $TiO_2$ | 5 | 10 | 1.1 | 0.1 | 0.1 | 0.1 | 3,807 | 3,645 | 3,286 | 3,286 |
| $ZrO_2$ | 5 | 10 | 0.8 | 0.8 | 0.5 | 0.4 | 2,220 | 2,364 | 2,528 | 2,528 |
| $HfO_2$ | 5 | 10 | >2.0 | 0.1 | 0.2 | 0.2 | 2,528 | 2,528 | 2,528 | 2,364 |
| $Nb_2O_3$ | 5 | 10 | >2.0 | 0.6 | 0.3 | 0.4 | 2,364 | 2,364 | 2,364 | 1,860 |
| $Ta_2O_3$ | 5 | 10 | >2.0 | 0.1 | 0.2 | 0.3 | 2,364 | 2,220 | 2,220 | 2,364 |
| $H_2W_4$ | 5 | 10 | 1.1 | 0.4 | 0.3 | 0.3 | 1,356 | 1,356 | 1,524 | 1,692 |
| $Ni_2O_3$ | 5 | 10 | 1.1 | >2.0 | 0.8 | 0.5 | >2,700 | >2,700 | 2,696 | 2,696 |
| $Mo_2O_3$ | 5 | 10 | 1.7 | >2.0 | >2.0 | 0.3 | 1,356 | 1,356 | 1,356 | 1,188 |
| $Cr_2O_3$ | 5 | 10 | 0.9 | 0.1 | 1.4 | 0.1 | 2,639 | 2,471 | 2,471 | 2,471 |
| None | 0 | 10 | Burns | Burns | Burns | Burns | Not tested | | | |

[1] Texin 480A mixed with 4 phr. of methylene-bis-acrylamide, 10 phr. antimony trioxide, but with no titanium dioxide or Kyna, gave a heat aging life of 3,286, 3,023, 2,433 and 2,433 hours respectively after 0, 5, 10 and 20 megarad doses when heat aged at 175° C.

EXAMPLE II

The polyurethane used in this example contained twenty parts per hundred of polyvinylidene fluoride (Kynar 1875). The aluminum oxide used in this example was Alcoa 730. The polyurethane compositions tested according to this example contained aluminum oxide alone or in combination with antimony oxide. The results of these tests are set forth in Table 2.

TABLE 2

| $Al_2O_3$ (p.h.r.) | $Sb_2O_3$ (p.h.r.) | Flammability (inches) after irradiation dose of: (megarads) | | | | Heat-aging life (hours) after irradiation dose of: (megarads) | | | |
|---|---|---|---|---|---|---|---|---|---|
| | | 0 | 5 | 10 | 20 | 0 | 5 | 10 | 20 |
| 5 | 10 | 0.8 | 0.4 | 0.2 | 0.2 | 2,528 | 1,692 | 1,524 | 1,524 |
| 10 | 5 | 1.4 | 0.5 | 0.8 | 0.8 | 2,528 | 1,356 | 1,356 | 1,356 |
| 15 | 0 | >2.0 | 0.6 | 0.4 | 0.2 | 1,356 | 1,188 | 1,188 | 1,188 |

It is to believed to be readily apparent from Table 2 that the addition of aluminum oxide in combination with antimony oxide has excellent effect both with regard to flame resistance and heat aging whereas aluminum oxide alone in substantially greater amount produces appreciable improvement of flame resistance with appreciable retention of heat-aging characteristics, but that this composition is inferior to the composition also containing antimony oxide.

EXAMPLE III

This example illustrates the effectiveness of a boron compound, $B_2O_3$, as the activator in the present invention. The procedure set forth in Example I, using twenty parts per hundred of polyvinylidene fluoride, was followed and the results are set forth below.

TABLE 3

| Additive | Amount of additive (phr.) | $Sb_2O_3$ (phr.) | Flammability (inches) after irradiation dose of: (megarads) | | | |
|---|---|---|---|---|---|---|
| | | | 0 | 5 | 10 | 20 |
| $B_2O_3$ | 5 | 10 | 0.2 | 0.2 | 0.1 | 0.1 |
| $B_2O_3$ | 10 | | 1.0 | 1.4 | 0.6 | 1.4 |
| $B_2O_3$ | 20 | | 1.5 | 0.1 | 0.1 | 0.9 |
| $B_2O_3$ | 10 | 10 | 0.1 | 0.1 | 0.1 | 0.1 |

It can be seen that the boron compound is an extremely effective activator material. In fact, it was so effective in releasing halogen that the heat-aging of the above polymers was quite poor. This points out the importance in choosing the proper activator for condensation polymers so that halogen is not released at too low a temperature.

EXAMPLE IV

This example illustrates the effectiveness of the flame-retardant composition of the present invention in a silicone polymer. The polymer was a methyl silicone gum containing trifluoropropyl and vinyl groups, manufactured by the Dow Corning Corporation and designated as LS/420. Polyvinylidene fluoride, antimony oxide, in either the form of $Sb_2O_3$ or $Sb_2O_5$, and titanium dioxide were incorporated into the polymer. The polymer was tested in accordance with the procedures of Example I with the results set forth below in Table 4.

TABLE 4

| Amount of $PVF_2$ pts./100 of polymer | Amount of $TiO_2$ pts./100 of polymer | Amount of type of antimony oxide | Irradiation dose (Mrads) | Flammability (inches) |
|---|---|---|---|---|
| 40 | 0 | 0 | 20 | 2.8 |
| 40 | 5 | 10 phr. $Sb_2O_3$ | 20 | 0.05 |
| 40 | 5 | 10 phr. $Sb_2O_5$ | 20 | 1.2 |

EXAMPLE V

This example illustrates the effectiveness of the flame-retardant composition of the present invention in various polymers. The polymers tested were polyethylene, manufactured by Union Carbide and designated as DFD 6040, and ethylene-acrylic ester copolymer, designated as DPD 6169 and manufactured by Union Carbide, and a polyacrylic ester rubber, designated as Hycar 4021 and manufactured by the B. F. Goodrich Chemical Company. Various amounts of polyvinylidene fluoride (Kynar 1900E), antimony oxide, ammonium borofluoride, aluminum oxide and titanium dioxide were incorporated into the polymers. The flammability of the polymers was measured in accordance with the method of Example I. The results are set forth in Table 5 below.

TABLE 5

| Polymer | Polyvinylidene fluoride phr. | $Sb_2O_3$ phr. | $NH_4BF_4$ phr. | AlO.OH phr. | $Al_2O_3$ phr. | $TiO_2$ phr. | Flammability (inches) at 175° C. after irradiation dose of: (megarads) | | | |
|---|---|---|---|---|---|---|---|---|---|---|
| | | | | | | | 0 | 5 | 10 | 20 |
| Polyethylene | 30 | 20 | 5 | | | | 0.2 | (2) | (1) | (1) |
| | 40 | 20 | 5 | | | | 0.5 | 0.1 | 0.5 | 0.4 |
| | 30 | 20 | | 5 | | | 1.0 | | (1) | (1) |
| | 40 | 20 | | 5 | | | (1) | | | (1) |
| | 40 | 20 | | | | | (1) | | | (1) |
| | 30 | 20 | | | | | (1) | | | (1) |
| | 30 | 20 | | | 10 | | (1) | (1) | (1) | (1) |
| | 30 | 20 | | | | 10 | 1.5 | 0.5 | 0.5 | 0.2 |
| | 30 | 20 | | | 5 | | (1) | (1) | (1) | (1) |
| | 30 | 20 | | | | 5 | (1) | (1) | (1) | (1) |
| Ethylene acrylic ester copolymer | 30 | 20 | 5 | | | | 0.1 | 0.6 | 0.2 | 0.5 |
| | 40 | 20 | 5 | | | | 0.2 | 0.1 | >2.0 | 0.4 |
| | 30 | 20 | | 5 | | | 0.5 | (1) | 0.3 | 1.5 |
| | 40 | 20 | | 5 | | | 0.2 | (1) | 1.4 | (1) |
| | 30 | 20 | | | | | (1) | (1) | | (1) |
| | 40 | 20 | | | | | (1) | | | (1) |
| | 30 | 20 | | | 10 | | 0.3 | 0.5 | 0.2 | 0.3 |
| | 30 | 20 | | | | 10 | 0.1 | 0.2 | 0.2 | 0.1 |
| | 30 | 20 | | | 5 | | >2.0 | 0.3 | 0.2 | 0.3 |
| | 30 | 20 | | | | 5 | 0.7 | 0.2 | 0.2 | 0.1 |
| Polyacrylic ester rubber | 30 | 20 | 5 | | | | 0.1 | 0.2 | 0.1 | 0.1 |
| | 40 | 20 | 5 | | | | <0.1 | <0.1 | 0.0 | <0.1 |
| | 30 | 20 | | 5 | | | (1) | (1) | (1) | 0.7 |
| | 40 | 20 | | 5 | | | 0.7 | 0.2 | 1.0 | 1.5 |
| | 30 | 20 | | | | | (1) | (2) | (2) | 0.2 |
| | 40 | 20 | | | | | (1) | 0.2 | 0.3 | 0.7 |
| | 20 | 20 | 5 | | | | <0.1 | 0.2 | 0.6 | 0.4 |
| | 20 | 10 | 5 | | | | (1) | (1) | (1) | 0.6 |
| | 20 | 20 | 5 | | | | (1) | (1) | (1) | (1) |
| | 30 | 20 | | | 10 | | <0.1 | 0.3 | 0.3 | 0.3 |
| | 30 | 20 | | | 5 | | <0.2 | 0.5 | 0.7 | 0.3 |
| | 20 | 10 | | | 5 | | (1) | (1) | (1) | (1) |
| | 30 | 20 | | | 10 | | <0.1 | <0.1 | 0.0 | <0.2 |
| | 30 | 20 | | | | 5 | <0.1 | <0.1 | <0.1 | 1.0 |
| | 20 | 10 | | | | 5 | (1) | (1) | (1) | (1) |
| | 20 | 20 | | | | | (2) | (2) | (1) | (1) |
| | 20 | 20 | | | 10 | | 0.8 | 0.3 | 0.1 | 0.1 |
| | 20 | 20 | | | | 5 | 0.2 | 0.9 | (2) | 0.3 |
| | 20 | 20 | | | 10 | | 0.6 | 0.8 | (1) | (2) |
| | 20 | 20 | | | | 5 | (1) | (2) | (2) | (2) |

[1] Burns. [2] 50% burns.

EXAMPLE VI

This example illustrates the effect of various metal activating materials in the composition of the present invention. The polymer tested was the ethylene-acrylic ester copolymer used in Example V. Each sample contained 100 parts of polymer, 30 parts of polyvinylidene fluoride (Kynar 1900E), 20 parts of $Sb_2O_3$, and 10 parts of a metal activator. Samples were milled at 120° C., pressed into slabs 60 mils thick, irradiated to 20 megarads and tested in accordance with the method set forth in the previous examples. The time recorded in the table is the number of seconds required for the flame to extinguish after the ignited burner was removed from the sample. The results are set forth in Table 6 below.

TABLE 6

| Metal activator compound | Flammability | | | |
|---|---|---|---|---|
| | First ignition | | Second ignition | |
| | Time, secs. | Inches | Time, secs. | Inches |
| None | | Burns | | |
| $TiO_2$ | 9 | | 16 | 0.25 |
| Aluminum isopropoxide | 15 | | 12 | 0.15 |
| Ammonium hexafluorotitanate | 3 | | 12 | 0.05 |
| Titanium disulphide | 60 | 0.6 | | |
| Titanium diboride | 1 | | 29 | 0.15 |
| Ammonium hexafluoroaluminate | 6 | | 5 | 0.05 |
| Ammonium hydrogen tetraborate | 17 | | 65 | 0.25 |

It can be seen from the foregoing table that various metal compounds other than metal oxides are effective as activators in the present invention.

Broadly, it has been found that those elements which catalyze the dehydrofluorination of polyvinylidene fluoride at temperatures from about 50° C. to about 200° C. lower than would otherwise occur and preferably by about 50°–150° C., are most desirable for combination with antimony oxide and polyvinylidene fluoride to produce an effective flame-retardant system especially for polymers such as for polyurethanes. The present invention comprises such systems as well as the flame-retarded polymer compositions containing these systems. In addition, the present invention includes the two-component flame-retardant system comprising polyvinylidene fluoride and aluminum oxide together with polymer compositions containing this system. The amount of the flame-retardant system of the present invention which should be added to a polymer will depend upon the system itself and upon the specific composition of the polymer. Thus, the amount of flame-retardant system which should be added to the polymer may be expressed as that which will effectively flame-retard the polymer. Given the disclosure set forth above, only routine experimentation will be required to determine the necessary amount of flame-retardant system.

In general, the polyvinylidene fluoride and antimony oxide will each be present in an amount of at least about 5 phr., and the activator compound will be present in an amount of at least about 1 phr., the amount in each case being based on the amount of polymer. The choice of system will in many instances depend upon the heat-aging properties which it is desired to obtain. Where maximum high temperature life of condensation polymers, such as polyurethane, is desired, titanium compounds are preferred for use in the flame-retardant systems of the present invention while aluminum or boron compounds are generally preferred for use where maximum flame resistance is desired. In general, the heat-aging capability of the flame-retarded polyurethanes of the present invention should not be less than about 1,000 hours at 175° C. and more typically will be in the range of about 2,000–3,000 hours with even greater heat-aging capability properties being attainable with certain embodiments of this invention.

Having fully described the present invention, it is to be understood that it is not to be limited to the details set forth, but is of the full scope of the appended claims.

I claim:

1. A flame retardant composition comprising polyvinylidene fluoride, antimony oxide, the ratio of polyvinylidene fluoride to antimony oxide being from about 4:1 to 1:1, and a compound of an element which is capable of catalyzing the dehydrofluorination of polyvinylidene fluoride at a temperature from about 50° C. to about 200° C. lower than would occur in the absence of said compound and said compound being present in an amount sufficient to catalyze said dehydrofluorination.

2. A flame retardant composition comprising polyvinylidene fluoride, antimony oxide, the ratio of polyvinylidene fluoride to antimony oxide being from about 4:1 to 1:1, and a compound of an element selected from the group consisting of titanium, aluminum, zirconium, hafnium, columbium, tantalum, tungsten, chromium, nickel, boron and molybdenum, said compound being capable of catalyzing the dehydrofluorination of polyvinylidene fluoride at a temperature of from about 50° C. to about 200° C. lower than would occur in the absence of said compound and said compound being present in an amount sufficient to catalyze said dehydrofluorination.

3. A composition comprising a polymer and a flame-retardant system consisting essentially of about five parts per hundred parts of composition of polyvinylidene fluoride and an aluminum compound in an amount sufficient to catalyze dehydrofluorination of polyvinylidene fluoride at a temperature from 50° C. to about 200° C. lower than would occur in the absence of said compound.

4. The composition of claim 2 wherein said element is aluminum.

5. The composition of claim 2 wherein said element is zirconium.

6. The composition of claim 2 wherein said element is tungsten.

7. The composition of claim 2 wherein said element is boron.

8. A flame-retardant composition comprising polyvinylidene fluoride and aluminum oxide.

9. A composition comprising a polymer containing an effective flame-retarding amount of a flame-retardant system comprising at least about five parts per hundred parts of composition of polyvinylidene fluoride, at least about five parts per hundred parts of composition of antimony oxide and a compound of an element which is capable of catalyzing the dehydrofluorination of polyvinylidene fluoride at a temperature from about 50° C. to about 200° C. lower than would occur in the absence of said compound and said compound being present in an amount sufficient to catalyze said dehydrofluorination.

10. A composition comprising a polymer and an effective flame-retarding amount of a flame retardant system comprising at least about five parts per hundred parts of composition of polyvinylidene fluoride, at least about five parts per hundred parts of antimony oxide and a compound of an element selected from the group consisting of titanium, aluminum, zirconium, hafnium, columbium, tantalum, tungsten, chromium, nickel, boron and molybdenum, said compound being capable of catalyzing and dehydrofluorination of polyvinylidene fluoride at a temperature of from about 50° C. to about 200° C. lower than would occur in the absence of said compound and said compound being present in an amount sufficient to catalyze said dehydrofluorination.

11. The composition of claim 10 wherein said element is titanium.

12. The composition of claim 10 wherein said element is aluminum.

13. The composition of claim 10 wherein said element is tungsten.

14. The composition of claim 10 wherein said element is boron.

15. The composition of claim 10 wherein said polymer is polyurethane.

16. The composition of claim 10 wherein said polymer is a silicone polymer.

17. The composition of claim 16 wherein said polymer is an ethylene polymer.

18. The composition of claim 10 wherein said polymer is a polyacrylic ester.

19. A composition comprising a polymer and a flame-retardant system consisting essentially of polyvinylidene fluoride and an aluminum compound.

20. The composition of claim 19 wherein the polymer is polyurethane.

21. The composition of claim 2 wherein said compound is an oxide.

22. The composition of claim 2 wherein said compound is titanium dioxide.

23. The composition of claim 10 wherein said compound is an oxide.

24. The composition of claim 10 wherein said compound is titanium dioxide.

25. The composition of claim 19 wherein said aluminum compound is aluminum oxide.

(References on following page)

References Cited

UNITED STATES PATENTS

| | | | |
|---|---|---|---|
| 3,222,305 | 12/1965 | Lanham | 260—2.5 |
| 3,239,482 | 3/1966 | Rapp | 260—41 |

OTHER REFERENCES

Lindemann, Flame Retardants, Industrial and Engineering Chemistry, vol. 61 No. 5 May 1969 relies on article date reference 67 Dec. 10, 1963.

Schmidt, Flame-Retardant additive in Plastics, Trans. J. Plastic Inc. December 1965, paper presented January 1965.

MORRIS LIEBMAN, Primary Examiner

R. ZAITLEN, Assistant Examiner